(12) United States Patent
Silha et al.

(10) Patent No.: US 12,334,579 B2
(45) Date of Patent: Jun. 17, 2025

(54) BATTERY PACK WITH HANDLE

(71) Applicant: MILWAUKEE ELECTRIC TOOL CORPORATION, Brookfield, WI (US)

(72) Inventors: Wyatt R. Silha, Milwaukee, WI (US); Zachery Meyer, Hartland, WI (US); John G. Marx, Hartford, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 742 days.

(21) Appl. No.: 17/473,154

(22) Filed: Sep. 13, 2021

(65) Prior Publication Data

US 2022/0085451 A1    Mar. 17, 2022

Related U.S. Application Data (60) Provisional application No. 63/078,231, filed on Sep. 14, 2020.

(51) Int. Cl.
*H01M 50/256*    (2021.01)
*B65D 25/28*    (2006.01)
*H01M 50/262*    (2021.01)

(52) U.S. Cl.
CPC .......... *H01M 50/256* (2021.01); *B65D 25/28* (2013.01); *H01M 50/262* (2021.01)

(58) Field of Classification Search
None
See application file for complete search history.

(56) References Cited

U.S. PATENT DOCUMENTS

| | | | |
|---|---|---|---|
| 1,778,772 | A | 10/1930 | Reid |
| 2,025,149 | A | 12/1935 | Barkhausen et al. |
| 3,956,022 | A | 5/1976 | Fox |
| 4,632,888 | A | 12/1986 | Kump et al. |
| 4,727,620 | A | 3/1988 | Gummelt |
| 5,111,952 | A | 5/1992 | Stocchiero |

(Continued)

FOREIGN PATENT DOCUMENTS

| | | |
|---|---|---|
| CN | 204407373 U | 6/2015 |
| CN | 105161648 A | 12/2015 |

(Continued)

OTHER PUBLICATIONS

Machine translation of KR 910002595Y1, Apr. 1991.*

(Continued)

*Primary Examiner* — Jonathan Crepeau
(74) *Attorney, Agent, or Firm* — Michael Best & Friedrich LLP (57) ABSTRACT

A battery pack includes a housing, at least one battery cell, and a handle assembly. The battery cell is disposed within the housing. The handle assembly is coupled to the housing. The handle assembly includes a first handle catch, an elongate flexible member, a second handle catch, and a grip layer. The elongate flexible member has a first end and a second end. The elongate flexible member is coupled to the first handle catch. The first handle catch is disposed nearer to the first end than to the second end. The second handle catch is coupled to the elongate flexible member nearer to the second end than to the first end. The grip layer is disposed on at least a portion of each of the first handle catch, the elongate flexible member, and the second handle catch.

16 Claims, 6 Drawing Sheets

(56) References Cited

U.S. PATENT DOCUMENTS

| | | |
|---|---|---|
| 5,202,200 A | 4/1993 | McMillan, Jr. et al. |
| 5,278,003 A | 1/1994 | Francisco |
| 7,103,940 B2 | 9/2006 | Ogg |
| 8,168,324 B2 | 5/2012 | Streuer et al. |
| 8,263,257 B2 | 9/2012 | Bielawski et al. |
| 9,548,480 B2 | 1/2017 | Koeppel |
| 10,333,114 B2 | 6/2019 | Tononishi |
| 2002/0148634 A1 | 10/2002 | Braden |
| 2008/0199771 A1 | 8/2008 | Chiu |
| 2011/0300424 A1 | 12/2011 | Kim et al. |
| 2019/0183221 A1 | 6/2019 | Lai |
| 2022/0336907 A1* | 10/2022 | An ............... H01M 50/262 |

FOREIGN PATENT DOCUMENTS

| | | |
|---|---|---|
| CN | 105655514 A | 6/2016 |
| CN | 108336265 A | 7/2018 |
| CN | 208256748 U | 12/2018 |
| DE | 102010037656 A1 | 3/2012 |
| JP | S406547 Y | 2/1965 |
| JP | S5481801 U | 6/1979 |
| JP | H1040895 A | 2/1998 |
| JP | 2007-296241 * | 11/2007 |
| JP | 5003891 B2 | 8/2012 |
| JP | 2017-517318 * | 6/2017 |
| JP | 2017167780 A | 9/2017 |
| JP | 2018531710 A | 11/2018 |
| JP | 3220693 U | 3/2019 |
| JP | 2019068552 A | 4/2019 |
| JP | 2022536483 A | 8/2022 |
| JP | 2022551059 A | 12/2022 |
| JP | 2022554018 A | 12/2022 |
| JP | 2023526198 A | 6/2023 |
| KR | 19910002595 Y1 | 4/1991 |
| KR | 950022556 U | 8/1995 |
| KR | 19990006682 U | 2/1999 |
| KR | 1020050041300 A | 5/2005 |

OTHER PUBLICATIONS

International Search Report and Written Opinion for Application No. PCT/US2021/050036 dated Jan. 3, 2022 (10 pages).

Japanese Patent Office Action for Application No. 2023-516138 dated Apr. 16, 2024 (12 pages including English translation).

Australian Patent Office Action for Application No. 2021339827 dated Apr. 30, 2024 (5 pages).

Extended European Search Report for Application No. 21867746.6 dated Sep. 27, 2024 (14 pages).

* cited by examiner

BATTERY PACK WITH HANDLE

CROSS-REFERENCE TO RELATED APPLICATIONS

This application claims the benefit of U.S. Provisional Patent Application No. 63/078,231, filed on Sep. 14, 2020, the entire contents of which are incorporated by reference herein.

BACKGROUND

The present disclosure relates to handles, and more particularly to handles for battery packs.

SUMMARY

The present disclosure provides, in one aspect, a battery pack. The battery pack includes a housing, at least one battery cell, and a handle assembly. The battery cell is disposed within the housing. The handle assembly is coupled to the housing. The handle assembly includes a first handle catch, an elongate flexible member, a second handle catch, and a grip layer. The elongate flexible member has a first end and a second end. The elongate flexible member is coupled to the first handle catch. The first handle catch is disposed nearer to the first end than to the second end. The second handle catch is coupled to the elongate flexible member nearer to the second end than to the first end. The grip layer is disposed on at least a portion of each of the first handle catch, the elongate flexible member, and the second handle catch.

The present disclosure provides, in another aspect, a battery pack including a housing and a movable handle assembly. A recess is defined on a surface of the housing. A longitudinal axis extends through the housing. The movable handle assembly is coupled to the housing. The movable handle assembly includes an elongate flexible member. The elongate flexible member spans across at least a portion of the recess. The movable handle assembly moves from a retracted position to an extended position. The extended position includes the elongate flexible member disposed farther from the housing than in the retracted position. A plane containing the longitudinal axis bisects the movable handle assembly and the recess.

The present disclosure provides, in yet another aspect, a battery pack including a housing, at least one battery cell, and a handle assembly. A recess is defined in a surface of the housing. A longitudinal axis extends through the housing. The battery cell is disposed within the housing. The handle assembly is coupled to the housing. The handle assembly includes a first handle catch, an elongate flexible member, a second handle catch, and a grip layer. The elongate flexible member spans across at least a portion of the recess. The elongate flexible member has a first end and a second end. The elongate flexible member is coupled to the first handle catch. The first handle catch is disposed nearer to the first end than to the second end. The second handle catch is coupled to the elongate flexible member nearer to the second end than to the first end. The grip layer is disposed on at least a portion of each of the first handle catch, the elongate flexible member, and the second handle catch. The handle assembly moves from a retracted position to an extended position. The extended position includes the elongate flexible member disposed farther from the housing than in the retracted position. A plane containing the longitudinal axis bisects the movable handle assembly and the recess.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
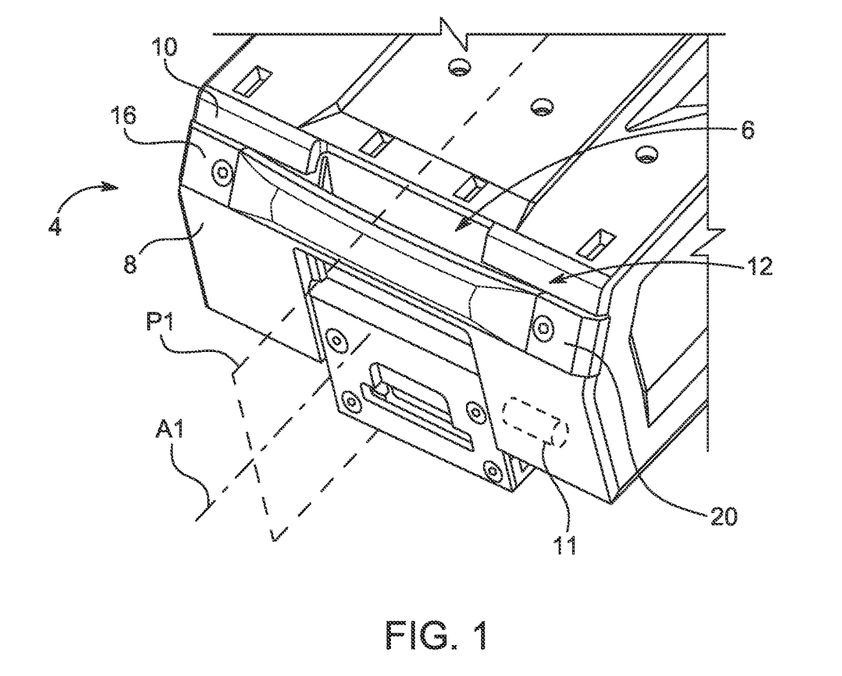
FIG. 1 is a detailed top perspective view of a battery pack having a handle, according to embodiments disclosed herein.
Figure 2:
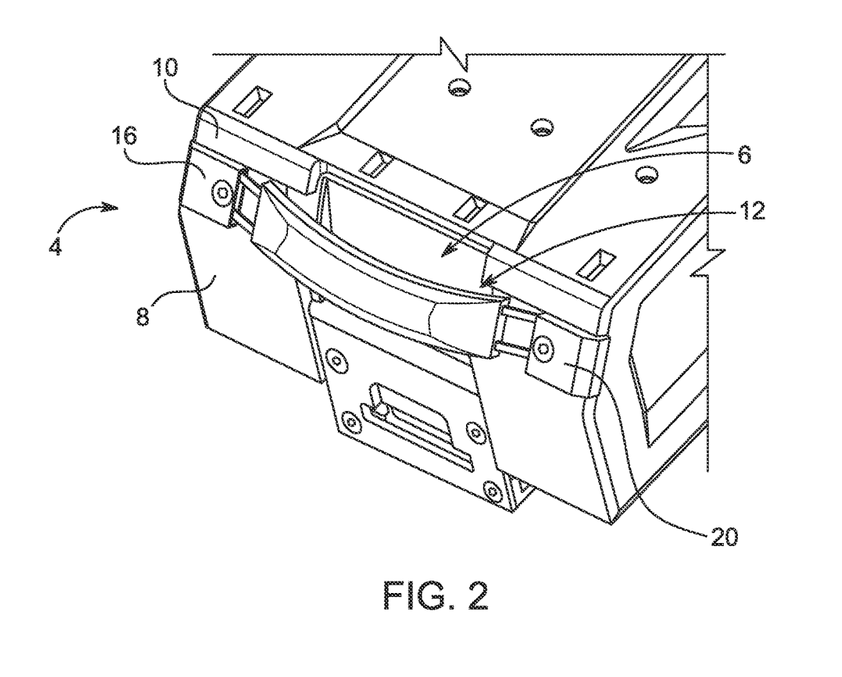
FIG. 2 is a detailed top perspective view of the battery pack of FIG. 1 with the handle in an extended position.

Referring to FIGS. 1 and 2, a battery pack 4 is shown. The battery pack 4 includes a housing 8 having a recess 6 defined in a surface 10 thereof. At least one battery cell 11 is enclosed within the housing 8. Coupled to the housing 8 is a handle assembly 12 configured to move between a retracted position (FIG. 1) and an extended position (FIG. 2) in which a portion of the handle assembly 12 is disposed farther from the housing 8 than in the retracted position. In the illustrated embodiment, the retracted position includes the handle assembly 12 lying relatively flat against the housing 8, and the extended position includes the handle assembly 12 bowed out relative to the housing 8. The handle assembly 12 is coupled to the housing 8 via first and second handle mounts 16, 20 (shown in detail in FIGS. 8-10) disposed on opposing sides of the recess 6. Each of the first handle mount 16 and the second handle mount 20 is configured to receive a portion of the handle assembly 12 therein such that the handle assembly 12 is slidable relative to the handle mounts 16, 20 between the retracted position and the extended position.

With continued reference to FIGS. 1 and 2, the housing 8 is substantially rectangular in shape and includes the recess 6 defined on a widthwise spanning surface 10 thereof. A plane P1 containing a longitudinal axis A1 of the housing 8 bisects the recess 6 and handle assembly 12. Further, the surface 10 is angled relative to a height direction of the housing 8. The handle assembly 12 spans the recess 6 such that the recess 6 provides easy access for a user to grasp the handle assembly 12. In some embodiments, the handle assembly 12 spans a majority of the width of the housing 8.

Figure 5:
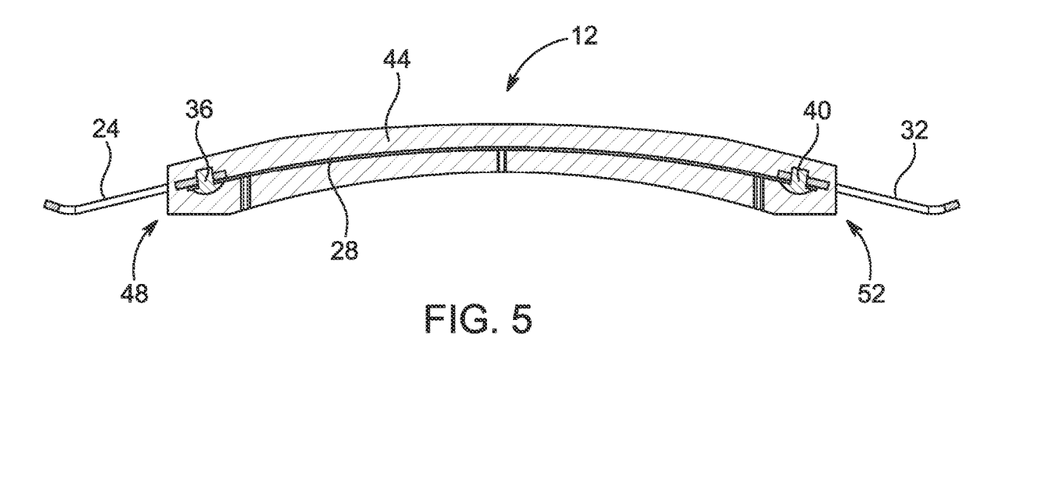
FIG. 5 is a cross-sectional front elevation view of the handle of FIG. 3.

Details of the handle assembly 12 will now be given with reference to FIGS. 3-7. The handle assembly 12 includes at least a first handle catch 24, an elongate flexible member 28, a second handle catch 32, a first fastener 36, a second fastener 40, and a grip layer 44. As best shown in FIG. 5, the elongate flexible member 28 is relatively bow shaped and includes a first end 48 and a second end 52. The first handle catch 24 is coupled to the elongate flexible member 28 proximate the first end 48, while the second handle catch 32 is coupled to the elongate flexible member 28 proximate the second end 52. In other words, the first handle catch 24 is disposed nearer to the first end 48 than to the second end 52, and the second handle catch 32 is disposed nearer to the second end 52 than to the first end 48. The first fastener 36 couples the first handle catch 24 to the first end 48, and the second fastener 40 couples the second handle catch 32 to the second end 52. In the illustrated embodiment, each of the first fastener 36 and the second fastener 40 is a rivet. However, in other embodiments, the first and second handle catches 24, 32 may be coupled to the elongate flexible member 28 in other ways, such as through welding, adhesives, screws, bolts, or the like.

Figure 3:
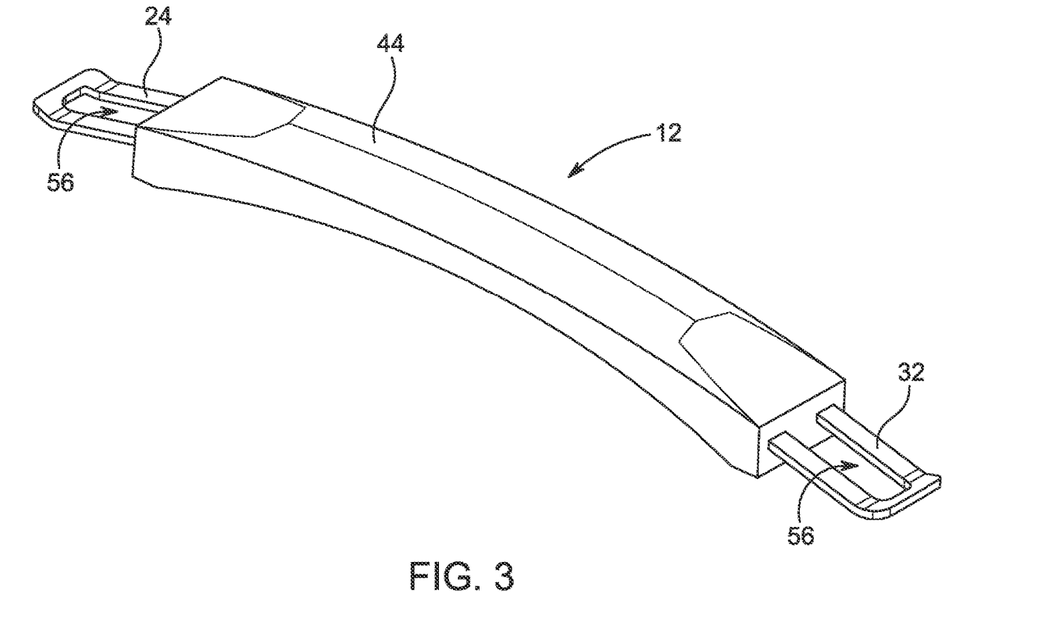
FIG. 3 is a perspective view of the handle of the battery pack of FIG. 1.
Figure 4:
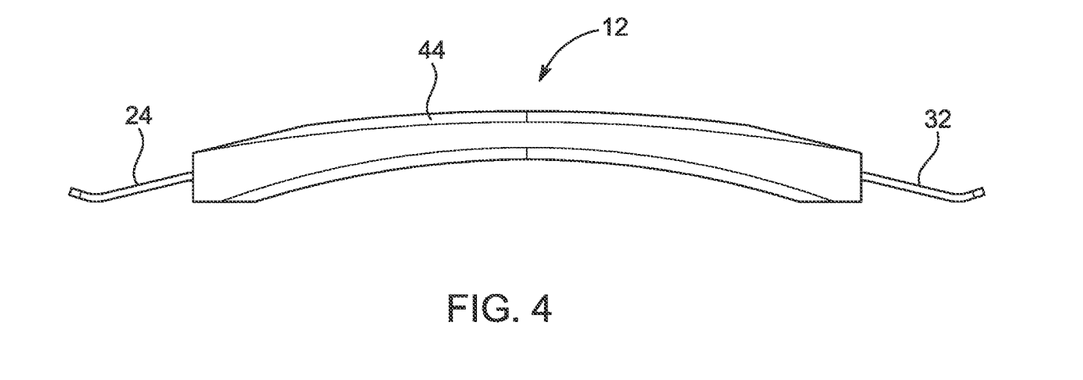
FIG. 4 is a front elevation view of the handle of FIG. 3.

As best shown in FIGS. 3 and 5, the grip layer 44 is included in the handle assembly 12 and envelops a majority of, and in some instances all of, the elongate flexible member 28. The grip layer 44 may be made of a resilient, pliable, or relatively soft material compared to the remainder of the handle assembly 12, such as a polymer. The grip layer 44 is intended to provide added comfort and/or an ergonomic benefit to a user. In the illustrated embodiment, the grip layer 44 surrounds the entirety of the elongate flexible member 28. Referring to FIG. 5, the grip layer 44 is also disposed on each of the first handle catch 24, the first fastener 36, the second handle catch 32, and the second fastener 40. In the illustrated embodiment, the grip layer 44 envelops the first and second fasteners 36, 40, while being disposed on only a portion of the first and second handle catches 24, 32. Portions of the handle assembly 12, such as the elongate flexible member 28, are inserted molded within the grip layer 44 to apply the grip layer 44 to the handle assembly 12. In other embodiments, the grip layer 44 may be a multi-piece clamshell separately formed from the handle assembly 12 and coupled to the handle assembly 12 during assembly.

Figure 6:
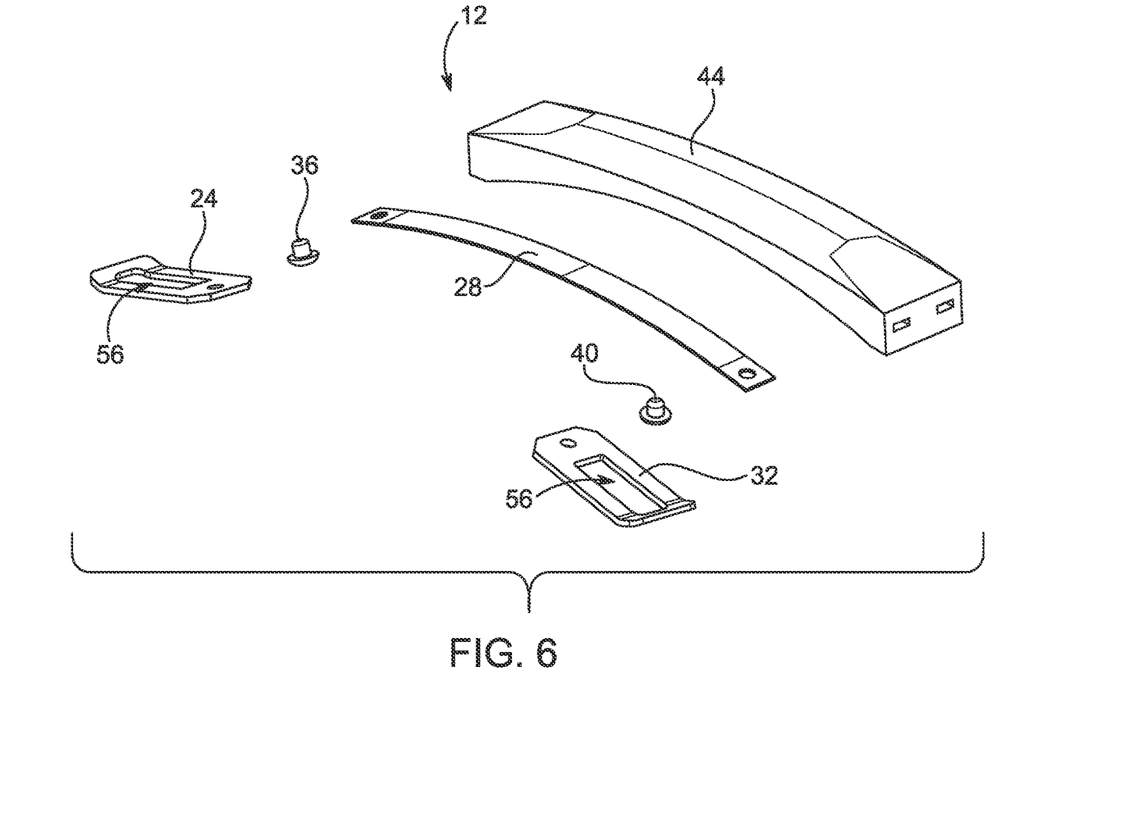
FIG. 6 is an exploded perspective view of the handle of FIG. 3.
Figure 7:
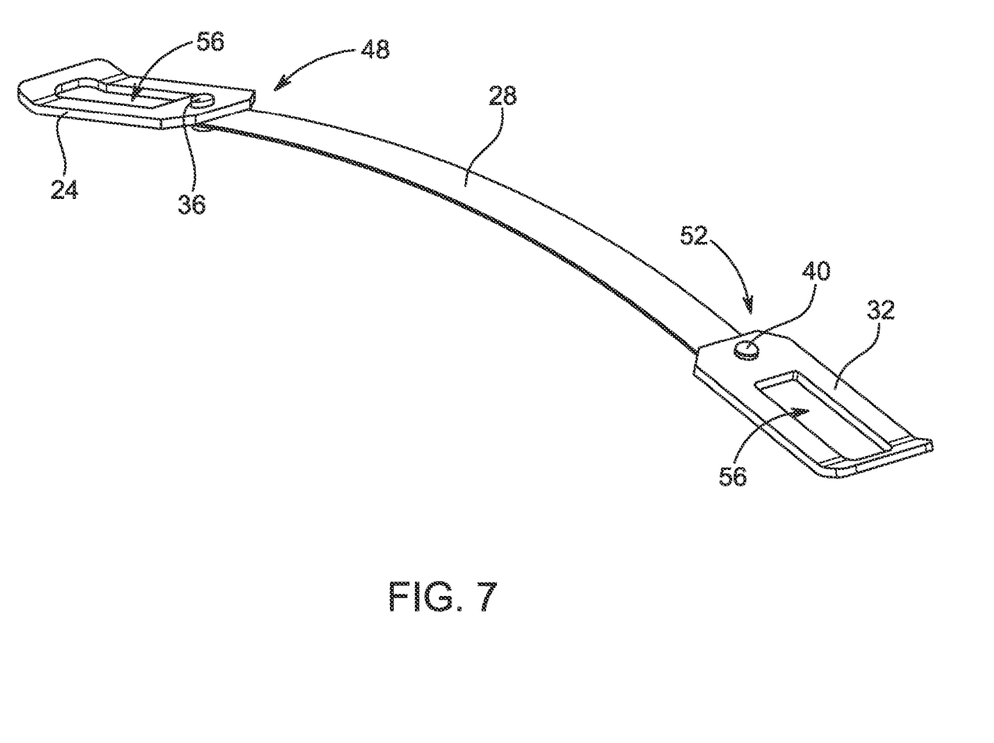
FIG. 7 is a top perspective view of the handle of FIG. 3 without the grip.

Referring now to FIGS. 3, 6, and 7, each of the first handle catch 24 and the second handle catch 32 is substantially rectangular in shape and includes an elongate slot 56 oriented along a longitudinal axis of the catch 24, 32. Furthermore, each handle catch 24, 32 includes a proximal end near which the respective fasteners 36, 40 are applied and a distal end opposite the proximal end. In the case of the grip layer 44 being disposed on a part of the handle catch 24, 32, the grip layer 44 covers at least part of the proximal end. Each distal end is bent at an angle relative to the remainder of the handle catch 24, 32. The angled distal ends may provide a resting orientation of the handle assembly 12 when in the extended position. This feature promotes the handle settling into and remaining in the extended position in some embodiments. In the illustrated embodiment, each of the distal ends is bent at an obtuse angle to the remainder of the handle catch 24, 32. The handle catches 24, 32 may be made of one or more metals including, for instance, hardened steel.

Referring now to FIGS. 5-7, the elongate flexible member 28 is relatively bow or arc shaped and may include a strap of spring steel. The spring steel is arc shaped when in a relaxed state and deformable to allow the handle to give when engaged by a user to the extended state. The arc of the spring steel has a smaller radius in the extended state than in the retracted/relaxed state. The spring steel biases the elongate flexible member 28 towards the retracted position which corresponds to the relaxed state.

Figure 8:
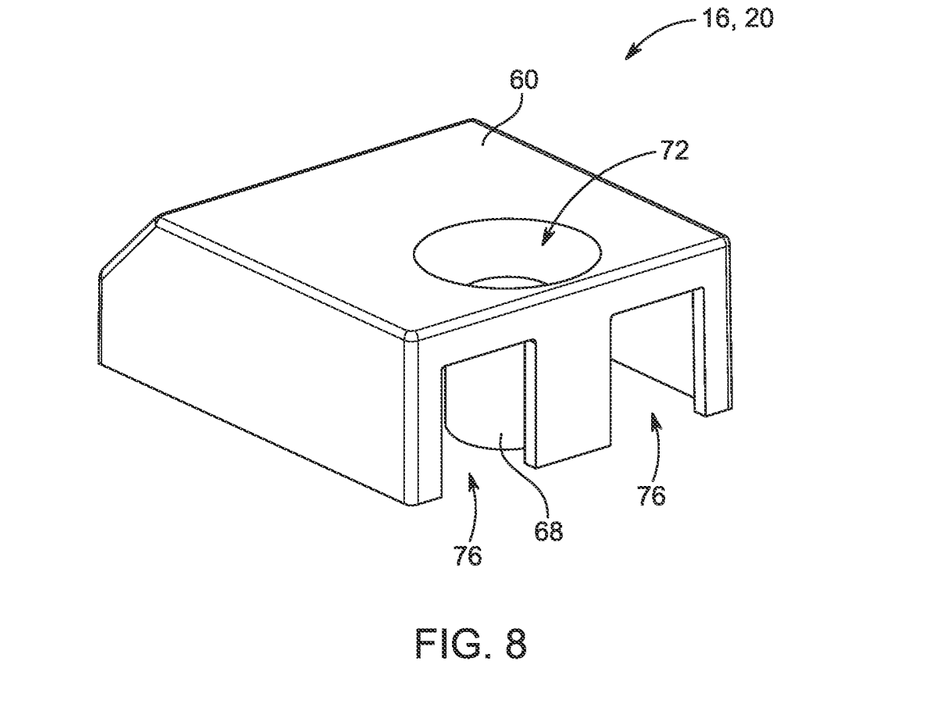
FIG. 8 is a top perspective view of a handle mount of the battery pack of FIG. 1.
Figure 9:
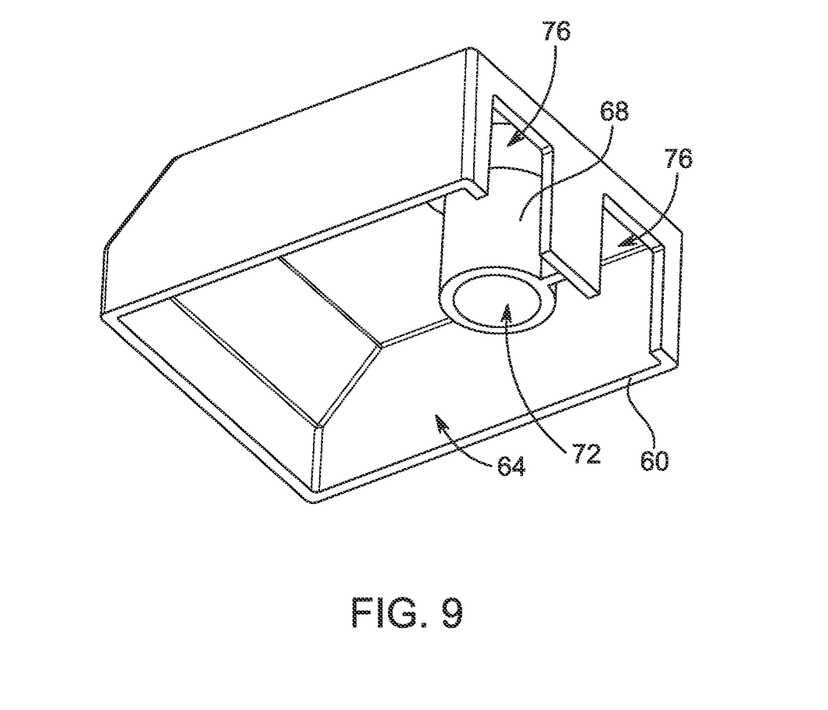
FIG. 9 is a bottom perspective view of the handle mount of FIG. 8.
Figure 10:
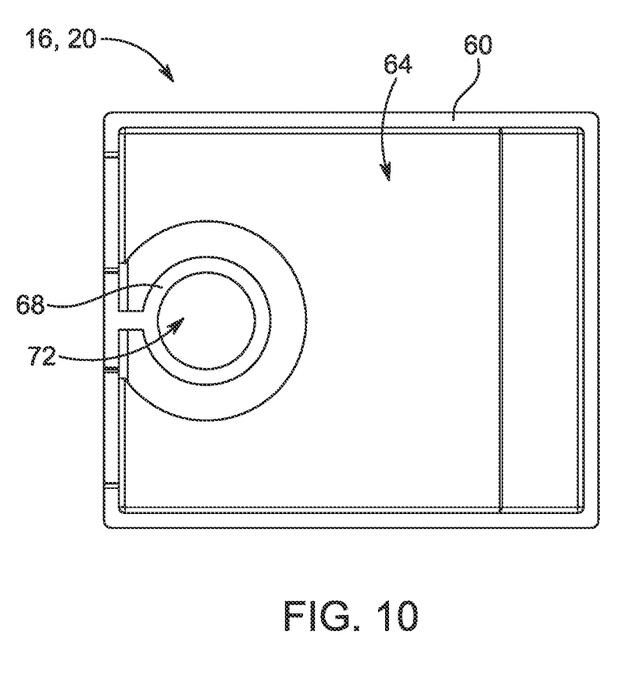
FIG. 10 is a bottom plan view of the handle mount of FIG. 8.

Details of the handle mounts 16, 20 will now be given with reference to FIGS. 8-10. Each of the handle mounts 16, 20 includes an outer body 60 defining an enclosed space 64. Extending from the outer body 60 is a post 68 having a passage 72 therein. The passage 72 is configured to receive a fastener for selectively securing the handle mount 16, 20 to the housing 8. Each post 68 is sized to be received within the elongated slot 56 of a respective one of the handle catches 24, 32. In the illustrated embodiment, the post 68 is cylindrical; however, other geometries are contemplated herein. Disposed on a side surface of the handle mount 16, 20 are two rectangular notches 76. The surface of the mount disposed between the two rectangular notches 76 corresponds in size and shape to the elongated slot 56. In this way, the handle catches 24, 32 are able to slide with respect to the handle mounts 16, 20 due to the elongated slots 56, but are prevented from rotating. The mounts 16, 20 may be formed from a metal, polymer, or other material. In some embodiments, the posts 68 may be formed of a different, relatively harder, material than the remainder of the mounts 16, 20.

During use of the handle in manipulating the battery pack 4, a user may pull the handle assembly 12 away from the battery pack 4 (e.g., into the extended position) to adequately grip the handle assembly 12. In pulling the handle assembly 12 away from the battery pack 4, each of the mounts 16, 20, and therefore each of the posts 68, remains in place relative to the housing 8 while the corresponding handle catch 24, 32 slidably moves relative to the post 68. Due to the elongated slots 56, each of the handle catches 24, 32 is free to slidably move relative to the corresponding post 68, while being prevented from rotating by the notches 76. Further, in pulling the handle assembly 12 away from the battery pack 4, the elongate flexible member 28 may flex into an arc shape of a smaller radius.

Once the user has finished utilizing the handle, the user may press on the handle assembly 12 to return it to the retracted position (FIG. 1). In some embodiments, the return to the retracted position is assisted by the spring steel of the elongate flexible member 28 returning to the relaxed shape. In some embodiments, the user need not press on the handle assembly 12 at all in order for the handle assembly 12 to return to the retracted position. In other embodiments, each of the handle catches 24, 32 may be mounted in each of the corresponding handle mounts 16, 20 with a bias pulling the handle catches 24, 32 away from each other to return the handle assembly 12 to the retracted position.

Although the disclosure has been described in detail with reference to certain preferred embodiments, variations and modifications exist within the scope and spirit of one or more independent aspects of the disclosure as described.

Various features and advantages of the disclosure are set forth in the following claims.

What is claimed is:

1. A battery pack comprising:
   a housing,
   at least one battery cell disposed within the housing, and
   a handle assembly coupled to the housing, the handle assembly including a first handle catch including a first slot,
   an elongate flexible member having a first end and a second end, the elongate flexible member coupled to the first handle catch, the first handle catch disposed nearer to the first end than to the second end, a second handle catch coupled to the elongate flexible member nearer to the second end than to the first end, the second handle catch including a second slot, a grip layer disposed on at least a portion of each of the first handle catch, the elongate flexible member, and the second handle catch, a first handle mount coupled directly to the housing, the first handle mount including a first post with a passage that receives a fastener, the first slot receiving the first post, and the first handle catch is slidable relative to the first handle mount, and a second handle mount coupled directly to the housing separately from the first handle mount, the second handle mount including a second post with a passage that receives a fastener, the second slot receiving the second post, and the second handle catch slidable relative to the second handle mount.

2. The battery pack of claim 1, wherein the grip layer envelops a majority of the elongate flexible member.

3. The battery pack of claim 2, wherein the elongate flexible member is insert molded within the grip layer.

4. The battery back of claim 2, wherein the handle assembly further includes a first fastener coupling the first handle catch to the elongate flexible member and a second fastener coupling the second handle catch to the elongate member, and wherein, the grip layer is disposed on at least a portion of each of the first fastener and the second fastener.

5. The battery pack of claim 4, wherein each of the first fastener and the second fastener are rivets.

6. The battery pack of claim 1, wherein each handle catch has a distal end angled relative to a remainder of the handle catch.

7. The battery pack of claim 6, wherein the distal end is at an obtuse angle relative to the remainder of the handle catch.

8. The battery pack of claim 1, wherein the elongate flexible member includes a strip of spring steel.

9. A battery pack comprising:
a housing,
a recess defined in a surface of the housing,
a longitudinal axis extending through the housing, and
a movable handle assembly coupled to the housing, the movable handle assembly including
an elongate flexible member spanning across at least a portion of the recess, the movable handle assembly moving from a retracted position to an extended position, the extended position including the elongate flexible member disposed farther from the housing than in the retracted position, and
a handle mount coupled directly to the housing on each of two opposing sides of the recess, each handle mount coupled to the housing outside of the recess, and each handle mount defining a closure space and having a post extending into the closure space, each post having a passage therein,
wherein a plane containing the longitudinal axis bisects the movable handle assembly and the recess.

10. The battery pack of claim 9,
wherein the movable handle assembly includes a catch coupled to the elongate flexible member proximate each handle mount, and wherein the closure space of each mount is configured to receive the catch.

11. The battery pack of claim 10, wherein each handle mount includes a wall having two notches and a central portion defined therebetween, the central portion is disposed within a slot of the catch.

12. The battery pack of claim 11, wherein the central portion and the slot are rectangular in cross-section.

13. The battery pack of claim 9, wherein the elongate flexible member extends across a majority of a width of the battery pack.

14. The battery pack of claim 9, wherein the surface is angled relative to a height direction of the housing, the height direction oriented perpendicular to the longitudinal axis.

15. The battery pack of claim 9, wherein the movable handle assembly is biased toward the retracted position.

16. A battery pack comprising:
a housing,
a recess defined in a surface of the housing,
a longitudinal axis extending through the housing,
at least one battery cell disposed within the housing, and
a handle assembly coupled to the housing, the handle assembly including
a first handle catch having a first slot,
an elongate flexible member spanning across at least a portion of the recess and having a first end and a second end, the elongate flexible member coupled to the first handle catch, the first handle catch disposed nearer to the first end than to the second end,
a second handle catch coupled to the elongate flexible member nearer to the second end than to the first end, the second handle catch having a second slot,
a grip layer disposed on at least a portion of each of the first handle catch, the elongate flexible member, and the second handle catch,
a first handle mount coupled directly to the housing at a first side of the recess and outside of the recess, the first handle mount including a first post with a passage that receives a fastener, the first slot receiving the first post, and the first handle catch is slidable relative to the first handle mount,
a second handle mount separate from the first handle mount, the second handle mount coupled directly to the housing at a second side of the recess and outside of the recess, the second handle mount including a second post with a passage that receives a fastener, the second slot receiving the second post, and the second handle catch slidable relative to the second handle mount,
wherein
the handle assembly is movable from a retracted position to an extended position, the extended position including the elongate flexible member disposed farther from the housing that in the retracted position, and
a plane containing the longitudinal axis bisects the handle assembly and the recess.

* * * * *